United States Patent [19]

Wright

[11] 4,362,316
[45] Dec. 7, 1982

[54] FOLDING TRAILER

[76] Inventor: John O. Wright, 35 Heybridge St., Auckland, New Zealand

[21] Appl. No.: 181,748

[22] Filed: Aug. 27, 1980

[30] Foreign Application Priority Data

Aug. 29, 1979 [NZ] New Zealand .......................... 191427

[51] Int. Cl.³ ............................................... B60P 9/00
[52] U.S. Cl. .................. 280/656; 280/491 R; 280/493; 280/639
[58] Field of Search .................. 280/639, 656, 659, 20, 280/493, 494, 491 R, 491 B, 491 D; 298/5, 21 B

[56] References Cited

U.S. PATENT DOCUMENTS 2,563,995 8/1951 East ..................................... 280/639
2,720,413 10/1955 Halverson .......................... 280/639
3,620,397 11/1971 Gagnon ............................. 298/5 X

FOREIGN PATENT DOCUMENTS

486003 8/1952 Canada ................................. 280/639
984428 2/1976 Canada ................................. 280/20

Primary Examiner—Robert J. Spar
Assistant Examiner—Donald W. Underwood
Attorney, Agent, or Firm—Holman & Stern

[57] ABSTRACT

A folding trailer is provided having a chassis supported by at least one pair of road wheels and a load bearing platform supported by the chassis, the load bearing platform being formed in two sections which are foldable between a first position in which the sections lie in a common plane and a second position in which the sections lie juxtaposed in parallel planes. When in the second position the trailer can be moved into a substantially vertical plane for stowage.

14 Claims, 14 Drawing Figures

FOLDING TRAILER

BACKGROUND OF THE INVENTION

This invention relates to trailers and in particular to a folding trailer.

It is an object of the present invention to provide a trailer which will at least provide the public with a useful choice.

Accordingly, the invention consists in a trailer including a chassis; at least one pair of road wheels mounted on said chassis to operatively support the same; a load bearing platform mounted on said chassis, said load bearing platform being formed in two sections, said two sections being foldable between a first position in which said two sections lie in a substantially common plane and a second position in which said two sections are juxtaposed in substantially parallel planes; and a draw bar extending from said chassis or said load bearing platform substantially perpendicular to the axle line of said wheels for connection to a towing vehicle.

To those skilled in the art to which this invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

One preferred form of the invention will now be described with reference to the accompanying drawings in which.

Figures 3, 4:
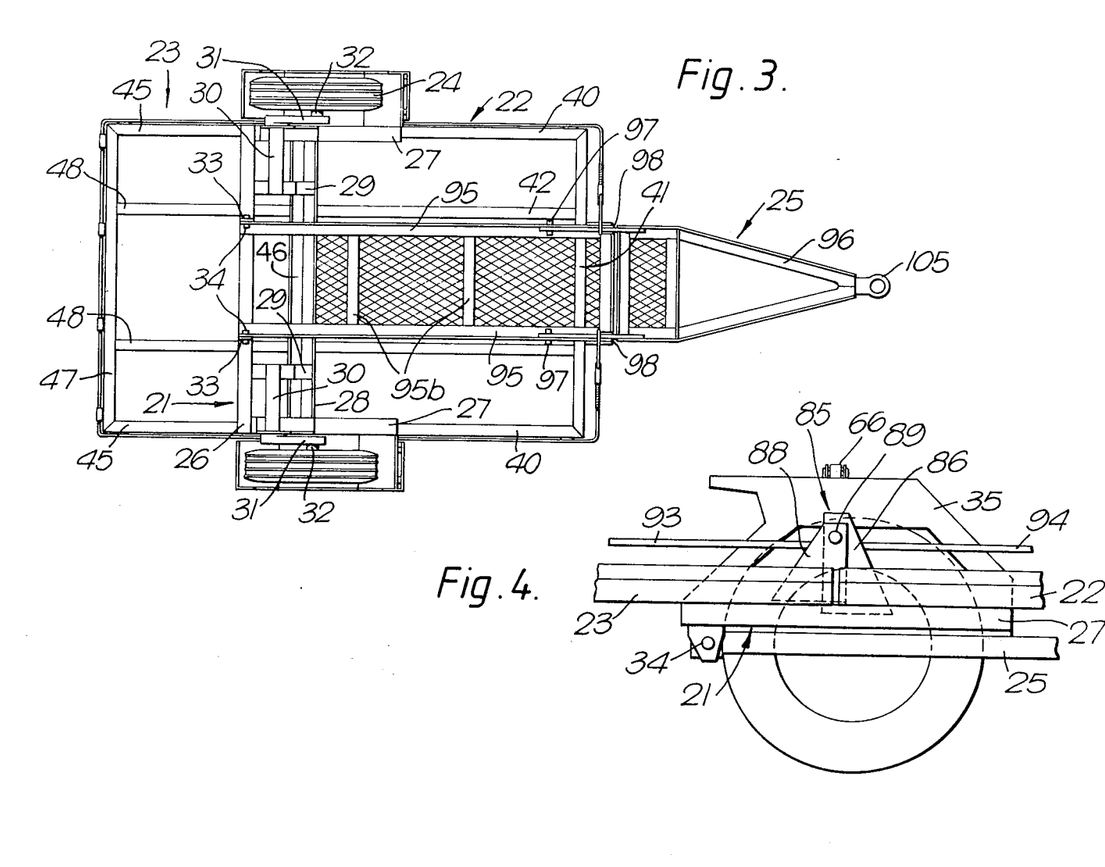
FIG. 3 shows an underside plan view of the trailer depicted in FIG. 1.
FIG. 4 shows an enlarged sectional elevational view of part of the trailer depicted in FIG. 1.

Referring to the drawings the invention provides a trailer 20 having a chassis 21, which can be seen most clearly in FIG. 3, and a load bearing platform formed by two sections 22 and 23 mounted on the chassis 21 and foldable between a first position in which the two sections lie in a substantially common plane, and a second position in which the sections 22 and 23 lie in juxtaposition in substantially parallel planes. A pair of wheels 24 are further provided to support the chassis 21 and load bearing platform above the ground as is a draw bar 25 which extends from substantially mid-way between the wheels 24 perpendicular to the axis thereof to provide an operative connection whereby the trailer may be towed by a powered vehicle.

Referring more particularly to FIG. 3 the chassis 21 comprises a cross member 26 formed from a substantial structural member such as RHS steel tube. Extending forwardly from either end of the cross member 26, in a substantially parallel manner, is a pair of side members 27 which in turn are affixed to the underside of the front section 22 of the load bearing platform in a manner as will be hereinafter described. The two spaced side members 27 are further interconnected by a further cross member 28 defining the front of the chassis which is positioned beneath the rear cross member (not shown) of the front load bearing platform section 22. Spanning between the cross members 26 and 28 in positions spaced from the side members 27 are a pair of angle members 29 and these angle members 29 in combination with the side members 27 provide mounting points for two torsional rubber suspension units 30 which may be of the type sold under the trade mark "DURATORQUE". Arms 31, operatively connected to the suspension elements, project from the outer ends of each of the suspension units 30 and locate dead axles 32 which in turn mount the wheels 24 through appropriate bearings. It will be noted from the figures that the rotational axes of the wheels 24 lie ahead of the cross member 26.

The chassis further includes a pair of spaced lugs 33 which receive the arms of the draw bar frame 25 and mount the same through pivot pins 34 thus providing a pivotal connection between the chassis and the draw bar.

Figure 1:
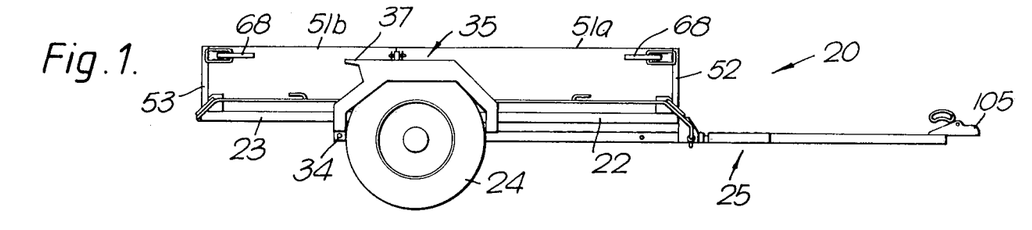
FIG. 1 shows a side elevational view of a trailer according to the invention.

A pair of mudguards 35 are mounted on each side of the chassis 21 by brackets (not shown) engaging spaced points on the side members 27. It will be noted from FIGS. 1 and 4 that the mudguards have top surfaces 36 which extend rearwardly into a projection 37, the end of the projection 37 lying just forward of a vertical line through the rear edge of cross member 26 for reasons which will become evident hereinafter.

The front section 22 of the load bearing platform comprises a pair of side members 40 formed from inwardly facing pressed steel channel sections, the upper arm of the channel member being stepped to provide a mounting lip for a base member hereinafter described. The side members 40 are affixed by, for example, bolting to the chassis side members 27. The rear ends of the side members 40 are interconnected by a cross member (not shown) positioned above member 28 while the forward end of the members 40 are interconnected by cross member 41 of the same section as members 40. A pair of intermediate braces 42 are provided which extend parallel to the side members 40 between the cross members 28 and 41 and are substantially symmetrical about the centre line of the trailer. A suitable support base member 43 is located on the mounting lips of the side members 40 and front members 41 and fixed in position, the base member 43 being further supported by the intermediate braces 42. The base 43 may be formed of sheet metal but is preferably formed from plywood, chip board or the like.

The rear section 23 of the load bearing platform is attached to the section 22 in a manner which will be hereinafter described and is also supported by chassis 21, the section 23 comprising a pair of side members 45 which are preferably of an identical section to the members 40 and when in the operative position provide rearward extensions of the members 40. The forward ends of the side members 45 are, as shown, interconnected by cross member 46 while the rear ends of the members 45 are interconnected by cross member 47. A pair of intermediate braces 48 project between the cross members 46 and 47 along the same axis of the members 42. A further support base member 49 is provided on the rear section supported by the members 45 to 48 inclusive and again this member is preferably formed of the same material as is the base member 43.

As shown, the trailer is preferably provided with a pair of side boards and toe and tail boards in the conventional manner. In the form depicted, each side board is provided in two parts one of which is attached to the front section 22 of the load bearing platform and the other of which is attached to the rear section 23 of the load bearing platform. Thus side board section 50a is attached to the left hand side of section 22 while the side board section 50b, mounted in the same plane as side board section 50a, is mounted on rear section 23 of the load bearing platform. In a like manner, side board section 51a is mounted on section 22 while side board section 51b is mounted on the rear section 23. Toe board 52 is mounted on the front edge of the front section 22 of the load bearing platform interconnecting the front edges of side board sections 50a and 51a while the tail board 53 is mounted on the rear edge of the rear section 23 of the load bearing platform and interconnects the rear edges of the side board sections 50b and 51b.

Figure 14:
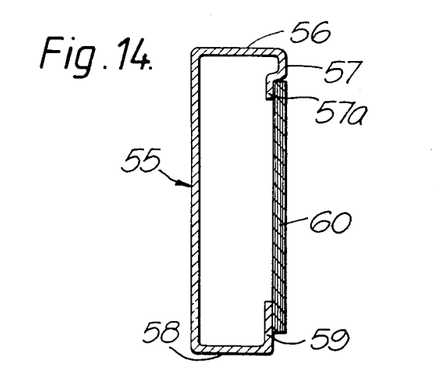
FIG. 14 shows a sectional view through a side board of a trailer according to the invention.

Referring to FIG. 14, each of the side board sections and the toe and tail boards are preferably formed from the combination of a sheet metal section with an insert on the inner face thereof to take the wear and tear from moving loads. Thus a portion of sheet metal is formed to provide outer surface 55, top edge 56 having inner edge 57 terminating in instepped lid 57a and bottom edge 58 having an upwardly turned flange 59 on the free edge thereof. A sheet of plywood, chip board or the like 60 is mounted on the lip 57a and the flange 59 and it will be noted that the spacing of the lip 57a from the upper edge 57 corresponds substantially to the thickness of the panel 60 so that the panel 60 lies substantially flush with the upper edge 57.

The folding arrangement of the trailer will now be described, from which, further structural features of the trailer will become apparent.

Before sections 22 and 23 can be folded the side boards 50 and 51 must be folded inwardly over the respective sections of the load bearing platform on which they are mounted. To enable this the side board parts are mounted on the load bearing platform sections by means of hinges 65 shown in FIGS. 6 and 8, the hinges 65 being affixed between the lower edges of each side board part and positions on the periphery of the load bearing platform sections 22 and 23 so that the side board portions 50a,50b and 51a,51b fold inwardly to lie substantially flat on the base members 43 and 49 substantially parallel to the side edges thereof.

Figure 2:
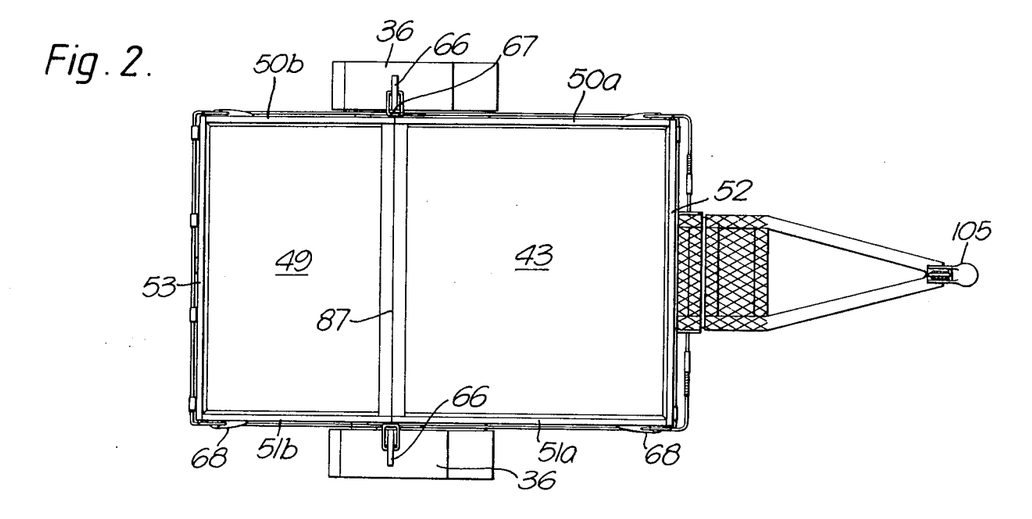
FIG. 2 shows a top plan view of the trailer depicted in FIG. 1.

Referring to FIG. 2 the side board parts 50a, 50b and 51a, 51b are retained in the erected position principally by means of catches 66 mounted on upper surface 36 of each mudguard 35, the catches 66 being preferably of the over-centre type and constructed and arranged to engage lugs 67 projecting from the juxtaposed edges of each of the side board portions 50a,50b and 51a, 51b. Thus the catches 66 not only retain each of the side board parts in the erected position, but further, interconnect side board parts 50a and 50b and parts 51a and 51b.

Secondary locking means to retain the side boards 50a,50b and 51a, 51b in the erected position is provided which locking means also serve to retain the toe board 52 and tail board 53 in the erected positions. The secondary lock locking means are provided by further over-centre clips 68 fastened to the front edges of the side board portions 50a and 51a and to the rear edges of side board portions 50b and 51b. These over-centre clips 68 engage with lugs 69 projecting from the edges of the toe board 52 and with lugs 70 projecting from the edges of the tail board 53. Thus upon release of the catches 66 and 68 the side boards may not only be allowed to pivot inwards but the toe and tail boards also be released.

Figure 5:
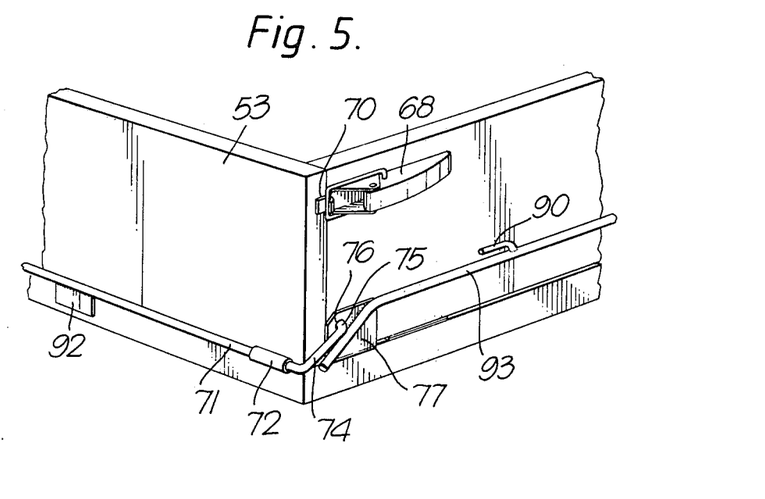
FIG. 5 shows an enlarged perspective view of a rear corner of the trailer depicted in FIG. 1 in the erected or operative position.
Figure 6:
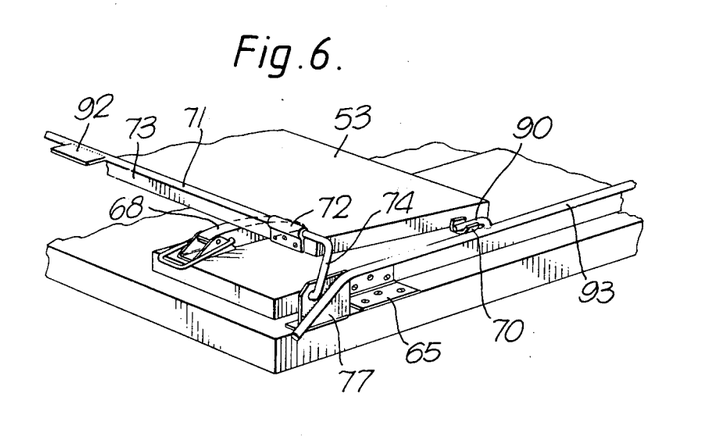
FIG. 6 shows a similar view to FIG. 5 with a trailer in a partially folded configuration.

Referring now to FIGS. 5 and 6, it will be noted that the tail board 53 is mounted on the rear section 23 of the load bearing platform by a double pivot arrangement. Thus a first pivot is provided between tail board 53 and rear pivot bar 71 by sleeves 72 which encircle the round pivot bar 71 and are attached to the lower edge 73 of the tail board 53 so as to project from the rear surface of the tail board. Both ends of the pivot bar 71 have sections 74 formed substantially perpendicular to the axes of the sleeves 72 and the sections 74 in turn terminate in inwardly turned fingers 75, the axes of which are substantially parallel to the axes of the sleeves 72 and engage, and may rotate in, apertures 76 provided in rear pivot plates 77. This double pivot arrangement not only allows the tail board 53 to pivot with respect to the plane of the load support section 23 but further, allows some degree of longitudinal displacement of the tail board with respect to the load bearing platform section 23 the purpose of which will be described hereinafter.

Figure 7:
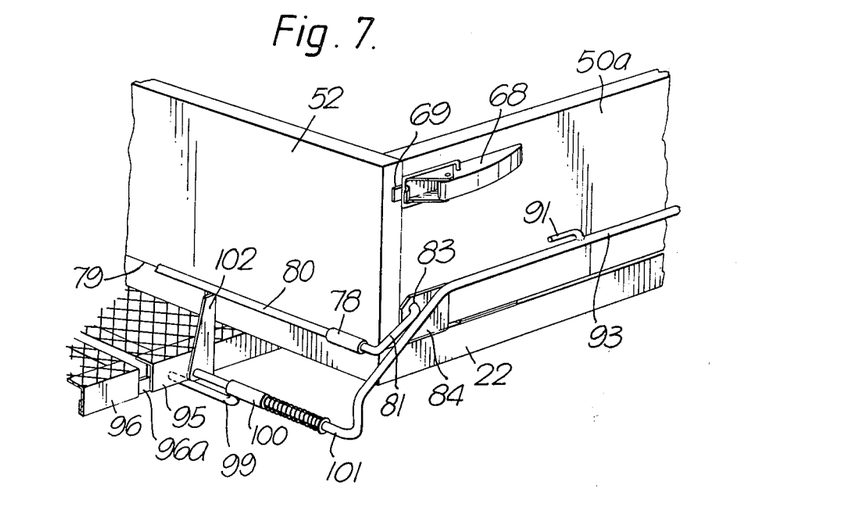
FIG. 7 shows a perspective view of a front corner of the trailer depicted in FIG. 1 in the erected or operative configuration.
Figure 8:
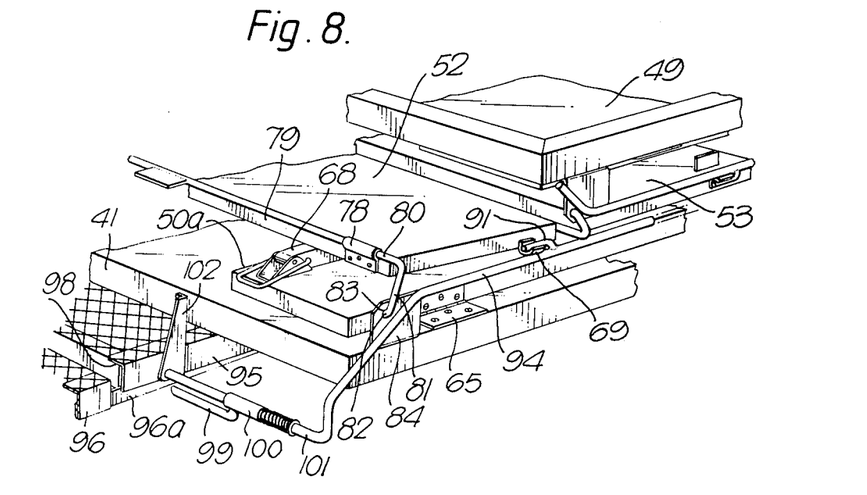
FIG. 8 shows a similar view to FIG. 7 with the trailer in the partially folded configuration.

Referring now to FIGS. 7 and 8, the toe board 52 is mounted onto the front load bearing platform section 22 in a similar manner as the rear tail board is mounted and accordingly, sleeves 78 are mounted on the bottom edge 79 of the toe board so as to project from the front surface of the toe board and these sleeves 78 in turn are rotatably mounted on a front pivot bar 80, the ends of which include sections 81 formed substantially perpendicular to the axis of the sleeve 78 and these sections 81 terminate in inwardly projecting fingers 82 which are rotatably supported in apertures 83 provided in front pivot plate 84. Again this double pivot arrangement not only allows the toe board 52 to pivot with respect to the plane of load bearing platform section 22 but further, allows some limited longitudinal displacement between the two components.

Figure 11:
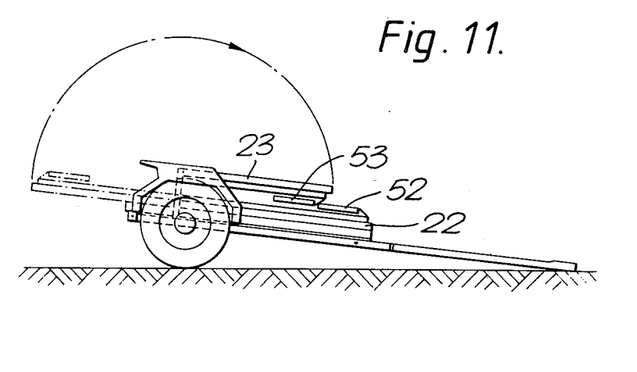
Figure 12:
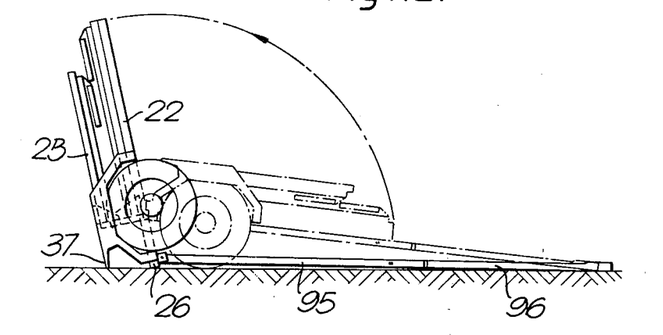
Figure 13:
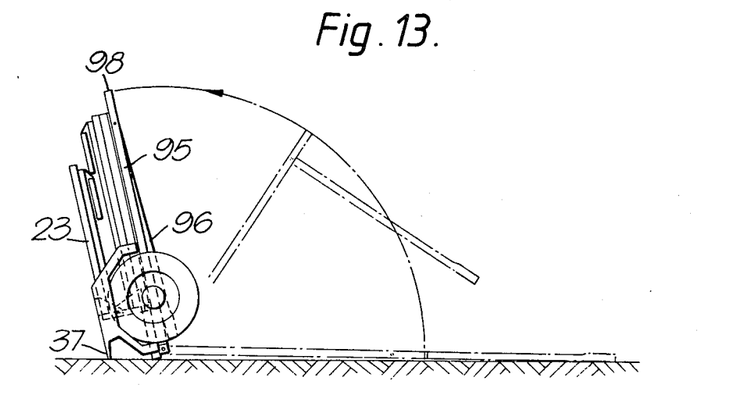

A further pivot arrangement is preferably provided between the load bearing platform sections 22 and 23 to allow the platform sections to move between the positions in which they lie in a substantially common plane to the positions depicted in FIGS. 11 to 13 inclusive in which the two sections lie juxtaposed in substantially parallel planes.

The pivot arrangement between the section 22 and 23 is shown in greater detail in FIG. 4 and it will be seen that the pivot 85 between the two components is preferably mounted above the common plane formed by the load bearing sections 22 and 23 when in the erected position so that when folded a space is provided between the two sections. Thus pivot plate 86 projects vertically up from the chassis side members 27 which in turn is bolted to the front section 22, at a position adjacent the joint line 87 between the sections 22 and 23. In a like manner pivot plate 88 projects vertically up from the side members 45 of the rear load bearing platform section 23 adjacent the joint line 87. As the spacing of the outer edges of chassis side members 27 is slightly greater than the spacing between the outer edges of side members 45, portions of the pivot plates 86 and 88 overlap so enabling cooperating apertures to be formed which in turn locate pivot pins 89.

While the front load bearing platform section 22 is attached by, for example, bolting to the chassis 21, the rear section 23 is mounted to the section 22 through the pivots 85 and merely rests on the chassis 21, the cross member 26 resisting the anticlockwise moment of the rear section 23. Thus, once the catches 66 have been released and the side board sections 50a, 50b and 51a, 51b have been folded inwardly the rear section 23 may be pivoted about pivot pins 89 to a position in which it lies juxtaposed to the section 22 substantially parallel thereto. It will be appreciated that to enable the substantially parallel arrangement to be attained, the tail board and toe boards must first be also folded inwardly.

The construction preferably includes some means to lock the side board components and the toe and tail boards in the folded positions to prevent these components flaying about as the rear load support section 23 is folded up and over the front load support section 22. The arrangement is preferably further designed so that interlocking may be provided to retain the two load support sections in interlocking engagement when in the folded position.

Referring firstly to FIGS. 5 and 6 it will be noted that as the side board parts 50b and 51b are folded inwardly and the tail board in turn folded inwardly thereover, the tail board 53 retains the side board sections in the folded configuration and thus only the tail board 53 need be physically restrained against unfolding. In the construction described hooks 90 are provided which are configured and arranged to engage the lugs 70 when the tail board 53 is pivoted down and then displaced forward, the movement being allowed for by the double pivoting mounting arrangement of the tail board 53. Thus as a first step the tail board 53 is pivoted down over the side board sections 50b and 51b by pure rotational movement of the sleeves 72 over the bar 71 and then the folded tail board 53 is displaced forward by pivoting bar sections 75 in apertures 76 to slide the lugs 70 under the hooks 90.

In a similar manner the lugs 69 projecting from the side edges of the toe board 52 are engaged under hooks 91 to retain the toe board 52 in the folded configuration over side board parts 50a and 51a, the toe board first being pivoted down over the front side board sections and then displaced rearwardly by rotating bar sections 82 in the mounting apertures 83 while at the same time allowing the main pivot bar section to pivot in the sleeves 78.

It will be noted from FIG. 6 that rear pivot bar 71 has a flat plate section 92 welded to the periphery thereof in such a manner that when the tail board 53 is in the erected position shown in FIG. 5 the plate section 92 (which cannot be seen in this view) lies substantially flat against the top edge of rear cross member 47, however it will be seen from FIG. 6 that when the toe board is folded inwards and displaced forward so that lugs 70 engage under hooks 90 the plate section 92 projects rearwardly behind the rear pivot bar 71. When the rear section 23 is pivoted up and over the front load support section 22 in a manner hereinbefore described, the plate 92 lies substantially parallel to the surface of base member 43 and is spaced from the front cross member 41 such a distance that as the folded toe board 52 is displaced rearwardly it projects over the plate 92 when viewed in plan and thus prevents reverse pivotal movement of the rear section 23 until such time as the folded toe board is projected forward to disengage lugs 69 from the hooks 91.

It will be appreciated from the drawings that the hooks 90 and 91 must be spaced above the plane of the base members 43 and 49 to allow the toe and tail boards to fold over the folded side board portions and for this reason the hooks are mounted on sections of rod, the hooks 90 being mounted on pieces of rod 93 spanning between rear pivot plates 77 and pivot plates 88 and the hooks 91 being mounted on rods 94 spanning between pivot plates 86 and front pivot plates 84.

The draw bar 25 is also preferably constructed and arranged to be folded and accordingly the draw bar comprises a pair of parallel longitudinal members 95 which engage the rear cross member 26 via pivot pins 34. The members 95 are preferably formed from angle section steel members and are interconnected by intermediate braces 95a. The members 95 pivotally mount a substantially U or V shaped towing bracket 96 at pivot points 97, the pivot points 97 being spaced from the free ends 98 of the members 95. The towing bracket 96 is also preferably formed from angle section of the same dimension as the section of the members 95, pivot plates 96a being welded to the inside of the flanges of the angles forming bracket 96 to project rearwardly to pivot points 97. A tow-hitch 98 is mounted at the apex of the towing bracket 96.

Catch means are provided to normally maintain the towing bracket 96 in the same plane as the members 95 and, as shown, the catch means comprise catch plates 99 which span across the bottom edges of the angle member 95 and the pivot plates 96a to maintain the bracket 96 in the same plane as members 95. The catch plates 99 are preferably mounted on sleeves 100 which are slidably mounted on a further section of rod material 101. As can be seen from FIGS. 7 and 8 the section of rod 101 is preferably a downward extension of the rod 94 which is turned inwardly and passes across the trailer in front of cross members 41 to engage brackets 102 extending vertically downward from the front cross member 41 adjacent the position in which the angle members 95 project beneath the cross member 41.

It will be appreciated that the sliding catch plates 99 not only maintain the bracket 96 in operative relationship with the angle members 95 but further, maintain the angle members 95 fixed against pivotal movement with respect to the chassis 21. Thus by sliding back the catch plates 99 to the position shown in FIG. 8 the otherwise assembled trailer can be made into a tilting trailer to assist in the removal of loads therefrom.

Figure 9:
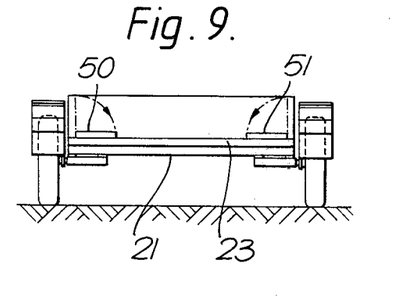
FIGS. 9 to 13 show a trailer according to the invention in various stages of folding.
Figure 10:
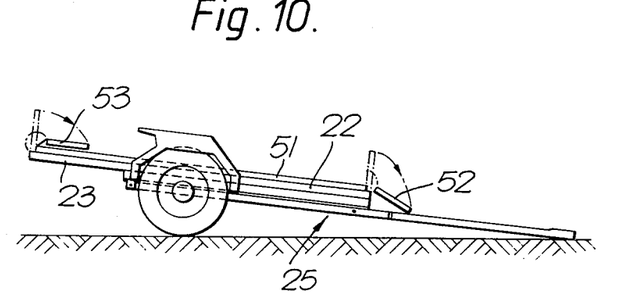

The operation of the construction will now be described:

Referring to FIGS. 9 to 13 inclusive in order to fold the trailer according to the invention, the catches 68 are first released and the toe board 52 and tail board 53 are folded outwardly. The catches 66 retaining the inner edges of each of the side board parts 50a, 50b and 51a, 51b are then released which allows the side boards to be folded inwardly over the base members 43 and 49 as shown in FIG. 9. Once the side boards parts have been folded inwardly, the tail board 53 may folded in over side board portions 50b and 51b and the lugs 70 engaged in the hooks 90 as shown in FIG. 10.

With the tail board 53 folded inwardly and locked under hooks 90, the entire rear support section 23 may then be folded about pivots 85 as shown in FIG. 11 and laid in position over front load support section 22. The toe board 53 may then be pivoted inwardly and displaced rearwardly so that lugs 70 engage under hooks 91. In this position the toe board projects over plate member 92 attached to rear pivot rod 73 when viewed in plan and accordingly the entire rear section 23 is locked against unfolding.

Once the section 23 has been locked in position, the catch plates 99 may be displaced to the position shown in FIG. 8 to release the draw bar locking mechanism and thereafter the folded sections 22 and 23 folded about the wheel axis until the rear of the mudguards 35 engage the ground surface whereupon the operator may apply a displacing force to the front cross member 41 to displace the trailer to the position depicted in FIG. 12 in which the folded trailer rests partially on the rear edge of the cross member 26 and the rear projection 37 of the mudguard.

It will be appreciated that as the draw bar is pivotted to the trailer chassis behind the wheel axis, then the effort required to displace the trailer to the position shown in FIG. 12 can be significantly reduced by the operator standing on the draw bar as the folding operation takes place. It will be apreciated that the additional weight on the draw bar creates an anticlockwise moment about the wheel axes which assists the trailer in attaining the stowing position.

Once the trailer is in the position shown in FIG. 12, the draw bar may be folded by raising the angle sections 95 and allowing towing bracket 96 to pivot about pivot points 97 until the toe hitch 98 rests on the ground. It will be appreciated that as the distance between pivots 34 and 97 is slightly less than the distance between pivot 97 and the forward extremity of toe hitch 98, that toe hitch 98 is firmly biased into contact with the ground surface and thus provides stability for the trailer in the stowed position depicted in FIG. 13.

Thus it will be appreciated that the present invention provides a trailer which is both stable in the assembled, operative configuration and yet can be readily and easily folded and stowed in a stable folded condition. Further by simle release of the catches 98 when in the otherwise operative configuration, the trailer can be used as a tilting trailer and again, the effort required to tilt the trailer can be reduced by the operator's weight being placed on the draw bar.

It will further be appreciated that at least in the preferred embodiment as described herein, a folding trailer construction is provided in which the parts combine to provide interlocking not only in the assembled configuration but also in the folded configuration and further the draw bar mounting not only facilites the folding operation but further feeds the loads directly into the chassis of the vehicle and avoids high towing stresses on the load bearing parts of the construction.

What is claimed is:

1. A trailer comprising: a load bearing section comprised of a front part and a rear part; a pair of wheels disposed in coaxially spaced relationship to each other and operatively connected to said load bearing section to support said load bearing section in a substantially horizontal towing configuration; and a draw bar projecting beyond the front of said load bearing section substantially perpendicular to the axis of said wheels to enable engagement of said trailer with a towing vehicle, said load bearing section being foldable between a first position in which said two parts lie in a substantially common plane and a second position in which said two parts are juxtaposed in substantially parallel planes, said axis being so located to permit said load bearing section when in said second position to be supported by said wheels in a substantially horizontal configuration and to be moved to a substantially vertical configuration in which vertical configuration said load bearing section is substantially supported by an end of said front or rear part, said draw bar being pivotally associated with said load bearing section rearward of said axis when said load bearing section is in the substantially horizontal configuration.

2. A trailer as claimed in claim 1 further including releasable catch means to prevent pivotal movement of said draw bar with respect to said load bearing section when said trailer is in the operative position.

3. A trailer as claimed in claim 1, wherein said two parts comprise a front part and a rear part and wherein said front part is fixed with respect to said wheels and said rear part is pivotally connected to said front part.

4. A trailer as claimed in claim 3 wherein the pivot between said two parts lies above said common plane.

5. A trailer as claimed in claim 1 or claim 3, further including side board parts provided on the longitudinal edges of said load bearing platform and a toe board and a tail board provided on the front and rear edges, respectively, of said load bearing section.

6. A trailer as claimed in claim 5 wherein said side board parts and said toe and tail boards are foldable between erected positions substantially perpendicular to said common plane and folded position substantially parallel to said common plane.

7. A trailer as claimed in claim 6 further including means to lock said side board parts and said toe and tail boards in said erected and folded positions.

8. A trailer as claimed in claim 7 wherein said toe and tail boards are mounted so as to lock said side board parts in the folded position when said toe and tail boards are in the folded position.

9. A trailer as claimed in claim 8 wherein a means to lock said toe and tail boards in the folded position is provided in part by means which lock said toe and tail boards to said side boards when said toe and tail boards and said side board parts are in the erected position.

10. A trailer as claimed in claim 9 wherein catch means are provided on said side board parts to engage with lugs projecting from the adjacent toe or tail board when said side board parts and said toe and tail boards are in the erected position and wherein when said toe and tail boards are in the folded position said lugs are engaged with hooks projecting from said parts of said load bearing section.

11. A trailer as claimed in claim 6, further including means to lock said load bearing platform sections in said second position.

12. A trailer as claimed in claim 11, wherein said means to lock said parts of said load bearing section in said second position comprises means projecting from the rear section when in said second position so as to lie beneath said toe board when said toe board is in the folded position.

13. A trailer as claimed in claim 1, wherein said draw bar is provided in two parts, a first draw bar part being pivotally mounted with respect to said load bearing section and a second draw bar part being pivotally connected to said first draw bar part such that when said load bearing section is in a substantially vertical configuration, said second draw bar part can be pivoted to enable the distal end thereof to contact the surface on which said trailer is supported.

14. A trailer as claimed in claim 1, further including a chassis between said load bearing section and said wheels, said draw bar being mounted on said chassis.

* * * * *